United States Patent
Ishino

(10) Patent No.: US 9,102,816 B2
(45) Date of Patent: Aug. 11, 2015

(54) TIRE RUBBER COMPOSITION AND PNEUMATIC TIRE

(71) Applicant: SUMITOMO RUBBER INDUSTRIES, LTD., Kobe-shi, Hyogo (JP)

(72) Inventor: Soh Ishino, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 14/343,000

(22) PCT Filed: Oct. 5, 2012

(86) PCT No.: PCT/JP2012/075894
§ 371 (c)(1),
(2) Date: Mar. 5, 2014

(87) PCT Pub. No.: WO2013/051679
PCT Pub. Date: Apr. 11, 2013

(65) Prior Publication Data
US 2014/0213713 A1 Jul. 31, 2014

(30) Foreign Application Priority Data

Oct. 6, 2011 (JP) ................. 2011-222157

(51) Int. Cl.
| C08L 15/00 | (2006.01) |
| C08L 9/00 | (2006.01) |
| C08C 19/00 | (2006.01) |
| B60C 11/00 | (2006.01) |
| B60C 1/00 | (2006.01) |
| C08C 19/44 | (2006.01) |

(52) U.S. Cl.
CPC ............... *C08L 15/00* (2013.01); *B60C 1/0016* (2013.04); *C08C 19/44* (2013.01); *Y02T 10/862* (2013.01)

(58) Field of Classification Search
CPC ........... C08L 15/00; C08L 9/00; C08C 19/00
USPC .............. 525/331.9, 374, 379, 385, 232, 236, 525/241, 332.8, 332.9, 333.1
See application file for complete search history.

(56) References Cited

U.S. PATENT DOCUMENTS

| 4,914,248 | A | * | 4/1990 | Kitagawa et al. ............. 525/113 |
| 6,906,152 | B2 | * | 6/2005 | Saito et al. ....................... 526/77 |
| 8,614,272 | B2 | * | 12/2013 | Uesaka et al. ................. 524/493 |
| 8,728,395 | B2 | * | 5/2014 | Suzuki et al. .................... 422/64 |
| 2007/0293622 | A1 | | 12/2007 | Yan |
| 2011/0160337 | A1 | * | 6/2011 | Ishino ............................ 523/157 |
| 2011/0172344 | A1 | * | 7/2011 | Yoshida et al. ................ 524/493 |
| 2012/0283354 | A1 | * | 11/2012 | Hattori et al. ................ 523/155 |

FOREIGN PATENT DOCUMENTS

| EP | 1 865 023 A1 | 12/2007 | |
| EP | 1 942 120 A1 | 7/2008 | |
| EP | 2 138 516 A1 | 12/2009 | |
| EP | 2 184 318 A2 | 5/2010 | |
| EP | 2 338 919 A1 | 6/2011 | |
| EP | 2 371 580 A1 | 10/2011 | |
| JP | 2001-114938 A | 4/2001 | |
| JP | 2006-306962 A | 11/2006 | |
| JP | 2006-306962 A | * 11/2006 | ................ C08L 9/06 |
| JP | 2008-143952 A | 6/2008 | |
| JP | 2008-195791 A | 8/2008 | |
| JP | 2009-533529 A | 9/2009 | |
| JP | 2010-248456 A | * 11/2010 | ............. C08L 15/00 |
| JP | 2010-254858 A | * 11/2010 | ............. C08L 15/00 |
| JP | 2011-89066 A | * 5/2011 | ............. C08L 15/00 |
| JP | 2011-144265 A | 7/2011 | |
| JP | 2011-178958 A | 9/2011 | |
| JP | 2011-219699 A | 11/2011 | |
| WO | WO 2010/044252 A1 | 4/2010 | |
| WO | WO 2011/087004 A1 | 7/2011 | |

OTHER PUBLICATIONS

Miyoshi, Masaki (JP 2010-254858) Nov. 11, 2010, abstract and translation in English.*
English machine translation for JP-2001-114938-A, published Apr. 24, 2001.
English machine translation for JP-2006-306962-A, published Nov. 9, 2006.
English machine translation for JP-2008-143952-A, published Jun. 26, 2008.
English machine translation for JP-2008-195791-A, published Aug. 28, 2008.
English machine translation for JP-2011-144265-A, published Jul. 28, 2011.
English machine translation for JP-2011-178958-A, published Sep. 15, 2011.
English machine translation for JP-2011-219699-A, published Nov. 4, 2011.
PCT/ISA/210—International Search Report mailed on Nov. 13, 2012, issued in PCT/JP/2012/075894.

* cited by examiner

*Primary Examiner* — Rip A Lee
(74) *Attorney, Agent, or Firm* — Birch, Stewart, Kolasch & Birch, LLP

(57) ABSTRACT

Provided are: a tire rubber composition improving fuel economy and abrasion resistance while maintaining good wet-grip performance or improving it; and a pneumatic tire including the same. The composition contains: a rubber component including a diene polymer (1); silica; and a diene polymer (2), the polymers (1) and (2) being modified diene polymers obtained by reacting components (A)-(B), the polymer (1) having a Mn of 110000-1500000, the polymer (2) having a Mn of 1000-100000, the amount of polymer (2) being 2-25 parts by mass per 100 parts by mass of the rubber component, wherein (A): an active alkali metal-terminated conjugated diene polymer obtained by polymerizing a conjugated diene monomer alone or with an aromatic vinyl monomer, in the presence of a component (C); (B): a modifying agent containing a functional group; (C): a chemical species obtained by reacting an organic alkali metal compound with a compound of formula (1):

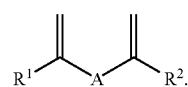

(1)

10 Claims, No Drawings

TIRE RUBBER COMPOSITION AND PNEUMATIC TIRE

TECHNICAL FIELD

The present invention relates to a tire rubber composition and a pneumatic tire including the rubber composition.

BACKGROUND ART

There are conventional techniques that improve fuel economy of vehicles by reducing rolling resistance of tires (i.e., by improving the rolling resistance performance). Today, however, there is an increasingly growing demand for higher fuel economy of vehicles. With this demand has come a demand for a rubber composition having excellent performance in terms of low heat build-up (excellent fuel economy) which is used for preparing a tread which is a tire component occupying a large portion of a tire compared with other tire components.

A known method for providing a rubber composition with sufficiently low heat build-up is to reduce the amount of reinforcing filler in the rubber composition. In this case, however, the hardness of the rubber composition is decreased and thus tires produced therefrom are softer. Such tires may disadvantageously impair vehicle steering performance (handling stability) and exhibit low wet grip performance and low abrasion resistance.

Patent Literature 1 teaches that the use of a modified styrene-butadiene rubber, which has been modified with a certain organic silicon compound containing an alkoxy group, enables improved fuel economy, wet grip performance, and abrasion resistance. However, in order to achieve satisfactory levels of all of these properties, further improvements are needed. Moreover, the modified styrene-butadiene rubber used has only one chain end modified, and modification of both chain ends or modification of two or more chain ends is not considered.

CITATION LIST

Patent Literature

Patent Literature 1: JP-A 2001-114938

SUMMARY OF INVENTION

Technical Problem

The present invention aims to provide a tire rubber composition that solves the above problems and enables improved fuel economy and abrasion resistance while maintaining good wet grip performance or improving it, and to provide a pneumatic tire including the rubber composition.

Solution to Problem

The present invention relates to a tire rubber composition, containing: a rubber component including a diene polymer (1); silica; and a diene polymer (2), the diene polymers (1) and (2) each being a modified diene polymer obtained by reacting a component (A) and a component (B), the diene polymer (1) having a number average molecular weight of 110000 to 1500000, the diene polymer (2) having a number average molecular weight of 1000 to 100000, an amount of the diene polymer (2) being 2 to 25 parts by mass per 100 parts by mass of the rubber component, wherein the component (A) is an active alkali metal-terminated conjugated diene polymer obtained by polymerizing a conjugated diene monomer alone or with an aromatic vinyl monomer, in the presence of a component (C), the component (B) is a modifying agent containing a functional group, and the component (C) is a chemical species obtained by reacting an organic alkali metal compound with a compound represented by the following formula (1):

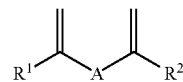

wherein $R^1$ and $R^2$ are the same as or different from each other and each represent a hydrogen atom, a branched or unbranched alkyl group, a branched or unbranched aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, a branched or unbranched arylene group, or a derivative thereof.

Preferably, the compound represented by the formula (1) is a compound represented by the following formula (2):

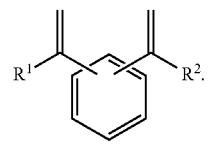

Preferably, the modifying agent is a compound represented by the following formula (3):

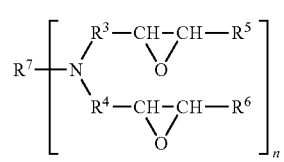

wherein $R^3$ and $R^4$ are the same as or different from each other and each represent a $C_{1-10}$ hydrocarbon group which may contain at least one selected from the group consisting of ether and tertiary amine groups; $R^5$ and $R^6$ are the same as or different from each other and each represent a hydrogen atom or a $C_{1-20}$ hydrocarbon group which may contain at least one selected from the group consisting of ether and tertiary amine groups; $R^7$ represents a $C_{1-20}$ hydrocarbon group which may contain at least one selected from the group consisting of ether, tertiary amine, epoxy, carbonyl, and halogen groups; and n represents an integer of 1 to 6.

Preferably, the same modifying agent is introduced into both chain ends of the active conjugated diene polymer.

Preferably, an amount of the diene polymer (1) is at least 5% by mass based on 100% by mass of the rubber component.

Preferably, the conjugated diene monomer is at least one of 1,3-butadiene and isoprene, and the aromatic vinyl monomer is styrene.

Preferably, the modified diene polymer is a modified styrene butadiene polymer obtained by polymerizing 1,3-butadiene and styrene.

Preferably, the silica has a nitrogen adsorption specific surface area of 40 to 250 m²/g.

Preferably, the tire rubber composition contains at least one of a silane coupling agent represented by the following formula (4), and a silane coupling agent that contains a linking unit A represented by the following formula (5) and a linking unit B represented by the following formula (6),

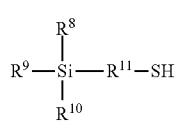

(4)

wherein $R^8$ represents a group represented by —O—($R^{12}$—O)$_m$—$R^{13}$ where m $R^{12}$s are the same as or different from each other and each represent a branched or unbranched $C_{1-30}$ divalent hydrocarbon group, $R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group, and m represents an integer of 1 to 30; $R^9$ and $R^{10}$ are the same as or different from each other and each represent a group as defined for $R^8$, or a branched or unbranched $C_{1-12}$ alkyl group or a group represented by —O—$R^{14}$ where $R^{14}$ represents a hydrogen atom, a branched or unbranched $C_{1-30}$ alkyl group, a branched or unbranched $C_{2-30}$ alkenyl group, a $C_{6-30}$ aryl group, or a $C_{7-30}$ aralkyl group; and $R^{11}$ represents a branched or unbranched $C_{1-30}$ alkylene group;

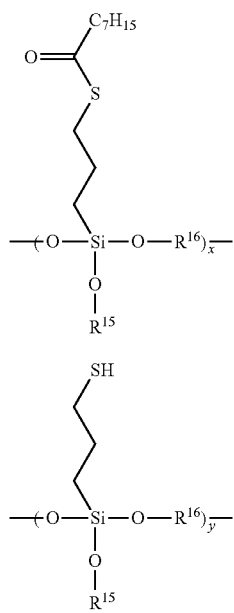

wherein $R^{15}$ represents hydrogen, a halogen, or a branched or unbranched $C_{1-30}$ alkyl group, a branched or unbranched $C_{2-30}$ alkenyl group, a branched or unbranched $C_{2-30}$ alkynyl group, or a group obtained by replacing a terminal hydrogen of the alkyl group with a hydroxy or carboxyl group; and $R^{16}$ represents a branched or unbranched $C_{1-30}$ alkylene group, a branched or unbranched $C_{2-30}$ alkenylene group, or a branched or unbranched $C_{2-30}$ alkynylene group, provided that $R^{15}$ and $R^{16}$ together may form a ring.

Preferably, the tire rubber composition is for use as a rubber composition for a tread.

The present invention also relates to a pneumatic tire, including the tire rubber composition.

Advantageous Effects of Invention

Since the tire rubber composition according to the present invention contains a rubber component including a specific modified diene polymer (1) that has a specific number average molecular weight, silica, and a specific modified diene polymer (2) that has a specific number average molecular weight in a certain amount, the tire rubber composition enables improved fuel economy and abrasion resistance while maintaining good wet grip performance or improving it. By using the rubber composition in a tire component such as a tread, a pneumatic tire excellent in the properties mentioned above can be provided.

DESCRIPTION OF EMBODIMENTS

The tire rubber composition of the present invention contains: a rubber component including a diene polymer (1) having a specific number average molecular weight; silica; and a certain amount of a diene polymer (2) having a specific number average molecular weight, the diene polymers (1) and (2) each being a modified diene polymer obtained by reacting a component (A) and a component (B) (hereinafter, also referred to as the modified diene polymer), wherein the component (A) is an active alkali metal-terminated conjugated diene polymer obtained by polymerizing a conjugated diene monomer alone or with an aromatic vinyl monomer, in the presence of a component (C), the component (B) is a modifying agent containing a functional group, and the component (C) is a chemical species obtained by reacting an organic alkali metal compound with a compound represented by the following formula (1):

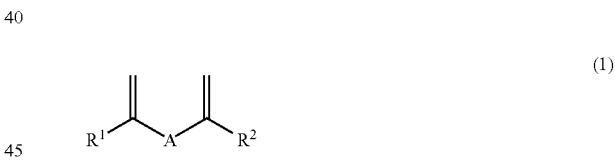

(1)

wherein $R^1$ and $R^2$ are the same as or different from each other and each represent a hydrogen atom, a branched or unbranched alkyl group, a branched or unbranched aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, a branched or unbranched arylene group, or a derivative thereof.

The diene polymers (1) and (2) are modified diene polymers each obtained by reacting the components (A) and (B). In the present invention, the diene polymer (1) is used in the rubber component, whereas the diene polymer (2) is used as a softening agent.

Since the chemical species (C), which is obtained by reacting a compound represented by the formula (1) and an organic alkali metal compound, is used as a polymerization initiator in the polymerization reaction, both ends of the polymer chain (the component (A) (active conjugated diene polymer)) formed by the polymerization reaction are living polymer ends. Thus, both chain ends of the active conjugated diene polymer (A) can be modified with the modifying agent (B). The modified diene polymer obtained by modifying both chain ends of the polymer (A) with the modifying agent (B), provides better fuel economy, wet grip performance, and abrasion resistance than the polymer having only one chain end modified, and it therefore provides a balanced improvement in these properties. In particular, since the diene polymer (2) has a softening effect, the substitution thereof with oil enables further better fuel economy and abrasion resistance.

There can be an alternative method for introducing a functional group (modifying group) into both chain ends of the polymer. In this method, polymerization is carried out using a polymerization initiator containing a functional group, and a modifying agent is reacted with a polymerizing end of the polymer. In this case, the resulting polymer has the functional group derived from the polymerization initiator at one chain end and the functional group derived from the modifying agent at the other chain end. However, the functional group of the polymerization initiator performs poorly with respect to the balance among fuel economy, wet grip performance, and abrasion resistance because the interaction between a functional group of a polymerization initiator and silica is generally weak. Moreover, functional groups of polymerization initiators are likely to be released, and thus contribute to an increase in energy loss, leading to poor fuel economy. Furthermore, in the case of using a polymerization initiator containing a functional group with high polarity, the functional group is coordinated with a living polymer end and thus affects the reaction between the polymerizing end and a modifying agent. In this case, a desired functional group cannot be introduced into the polymerizing end.

In contrast, since the component (A) is obtained by using the component (C) as a polymerization initiator, the polymer chain grows in two directions in the polymerization reaction, that is, it has two living polymer ends, which enables introduction of any functional group of any modifying agent. Therefore, when a rubber composition contains the modified diene polymer obtained by reacting the components (A) and (B), it has an excellent balance among fuel economy, wet grip performance, and abrasion resistance.

In the present invention, the modified diene polymer is used in the rubber component (i.e., as the diene polymer (1)) while the modified diene polymer is used as a softening agent (i.e., as the diene polymer (2)). This improves fuel economy and abrasion resistance while maintaining good wet grip performance or synergistically improving it. Therefore, the resulting rubber composition has excellent fuel economy, wet grip performance, and abrasion resistance.

In the present invention, the diene polymers (1) and (2) are modified diene polymers each obtained by reacting the components (A) and (B). Although the diene polymers (1) and (2) are only different in the number average molecular weight, their preferred embodiments (e.g., preferred monomer units or modifying agents) are the same. Accordingly, the methods for the production of the diene polymers (1) and (2), and the like are described together in the following. It is to be noted that the diene polymer (2) is not included in the rubber component.

The component (A) is an active alkali metal-terminated conjugated diene polymer obtained by polymerizing a conjugated diene monomer alone or with an aromatic vinyl monomer, in the presence of a component (C). It should be noted that the active conjugated diene polymer has two chain ends terminated with an alkali metal.

The component (C) is a chemical species obtained by reacting an organic alkali metal compound with a compound represented by the following formula (1).

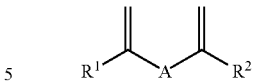

(1)

In the formula (1), $R^1$ and $R^2$ are the same as or different from each other and each represent a hydrogen atom, a branched or unbranched alkyl group, a branched or unbranched aryl group, a branched or unbranched alkoxy group, a branched or unbranched silyloxy group, a branched or unbranched acetal group, a carboxyl group (—COOH), a mercapto group (—SH), or a derivative thereof; and A represents a branched or unbranched alkylene group, a branched or unbranched arylene group, or a derivative thereof.

Examples of the branched or unbranched alkyl groups for $R^1$ and $R^2$ include $C_{1-30}$ alkyl groups (preferably $C_{1-8}$, more preferably $C_{1-4}$, further more preferably $C_{1-2}$ alkyl groups) such as methyl, ethyl, n-propyl, isopropyl, n-butyl, iso-butyl, sec-butyl, tert-butyl, pentyl, hexyl, heptyl, 2-ethylhexyl, octyl, nonyl, and decyl groups. The alkyl groups include alkyl groups whose hydrogen atom(s) is(are) substituted with an aryl group(s) (e.g. phenyl group).

Examples of the branched or unbranched aryl groups for $R^1$ and $R^2$ include $C_{6-18}$ (preferably $C_{6-8}$) aryl groups such as phenyl, tolyl, xylyl, naphthyl, and biphenyl groups. The aryl groups include aryl groups whose hydrogen atom(s) is(are) substituted with an alkyl group(s) (e.g. methyl group).

Examples of the branched or unbranched alkoxy groups for $R^1$ and $R^2$ include $C_{1-8}$ (preferably $C_{1-6}$, more preferably $C_{1-4}$) alkoxy groups such as methoxy, ethoxy, n-propoxy, isopropoxy, n-butoxy, and t-butoxy groups. The alkoxy groups include cycloalkoxy groups (e.g., $C_{5-8}$ cycloalkoxy groups such as cyclohexyloxy) and aryloxy groups (e.g., $C_{6-8}$ aryloxy groups such as phenoxy and benzyloxy).

Examples of the branched or unbranched silyloxy groups for $R^1$ and $R^2$ include silyloxy groups substituted with a $C_{1-20}$ aliphatic or aromatic group (e.g., trimethylsilyloxy, triethylsilyloxy, triisopropylsilyloxy, diethylisopropylsilyloxy, t-butyldimethylsilyloxy, t-butyldiphenylsilyloxy, tribenzylsilyloxy, triphenylsilyloxy, and tri-p-xylylsilyloxy groups).

Examples of the branched or unbranched acetal groups for $R^1$ and $R^2$ include groups represented by the formulae: —C(RR')—OR" and —O—C(RR')—OR". Examples of groups represented by the former formula include methoxymethyl, ethoxymethyl, propoxymethyl, butoxymethyl, isopropoxymethyl, t-butoxymethyl, and neopentyloxymethyl groups. Examples of groups represented by the latter formula include methoxymethoxy, ethoxymethoxy, propoxymethoxy, i-propoxymethoxy, n-butoxymethoxy, t-butoxymethoxy, n-pentyloxymethoxy, n-hexyloxymethoxy, cyclopentyloxymethoxy, and cyclohexyloxymethoxy groups.

Each of $R^1$ and $R^2$ is preferably a hydrogen atom, a branched or unbranched alkyl group, or a branched or unbranched aryl group. This improves the balance between fuel economy, wet grip performance and abrasion resistance. $R^1$ and $R^2$ are preferably the same so as to grow the polymer equally in two directions.

Examples of the branched or unbranched alkylene groups for A include $C_{1-30}$ (preferably $C_{1-8}$, more preferably $C_{1-4}$) alkylene groups such as a methylene group, ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group.

Examples of the derivatives of the above alkylene groups for A include alkylene groups substituted with an aryl or arylene group.

Examples of the arylene groups for A include a phenylene group, tolylene group, xylylene group, and naphthylene group.

Examples of the derivatives of the above arylene groups for A include arylene groups substituted with an alkylene group.

A is preferably a branched or unbranched arylene group, and more preferably a phenylene group (i.e., compounds represented by the following formula (2)). With such a structure, the balance among fuel economy, wet grip performance and abrasion resistance can be improved.

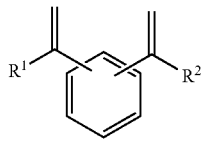

(2)

$R^1$ and $R^2$ in the formula (2) are defined as in the formula (1).

Specific examples of the compounds represented by the formula (1) or (2) include 1,2-divinylbenzene, 1,3-divinylbenzene, 1,4-divinylbenzene, 1,2-diisopropenylbenzene, 1,3-diisopropenylbenzene, 1,4-diisopropenylbenzene, 1,2-diisobutenylbenzene, 1,3-diisobutenylbenzene, 1,4-diisobutenylbenzene, 1,3-phenylenebis(1-vinylbenzene), 1,4-phenylenebis(1-vinylbenzene), 1,1'-methylenebis(2-vinylbenzene), 1,1'-methylenebis(3-vinylbenzene), and 1,1'-methylenebis(4-vinylbenzene). These may be used alone, or two or more of these may be used in combination. Preferred among these are 1,3-divinylbenzene, 1,3-diisopropenylbenzene, and 1,3-phenylenebis(1-vinylbenzene).

Examples of organic alkali metal compound that can be used in the present invention include hydrocarbon compounds containing an alkali metal such as lithium, sodium, potassium, rubidium, or cesium. Preferred among these are lithium- or sodium-containing compounds having 2 to 20 carbon atoms. Specific examples thereof include ethyllithium, n-propyllithium, iso-propyllithium, n-butyllithium, sec-butyllithium, t-octyllithium, n-decyllithium, phenyllithium, 2-naphthyllithium, 2-butyl-phenyllithium, 4-phenylbutyllithium, cyclohexyllithium, 4-cyclopentyllithium, and 1,4-dilithio-butene-2. Preferred among these are n-butyllithium and sec-butyllithium because they enable the reaction to proceed rapidly to provide a polymer with a narrow molecular weight distribution.

The method for preparing the component (C) is not particularly limited, as long as the compound represented by the formula (1) and the organic alkali metal compound are brought into contact. Specifically, the component (C) can be prepared by separately dissolving the compound represented by the formula (1) and the organic alkali metal compound in an organic solvent that is inert to the reaction (e.g., a hydrocarbon solvent), and adding dropwise the solution of the organic alkali metal compound to the solution of the compound represented by the formula (1) with stirring. The reaction temperature in preparing the component (C) is preferably 40° C. to 60° C.

The hydrocarbon solvent refers to a solvent that does not deactivate the organic alkali metal compound (alkali metal catalyst), and may suitably be selected from aliphatic hydrocarbons, aromatic hydrocarbons, and alicyclic hydrocarbons, particularly those having 2 to 12 carbon atoms, such as propane, n-butane, iso-butane, n-pentane, iso-pentane, n-hexane, cyclohexane, propene, 1-butene, iso-butene, trans-2-butene, cis-2-butene, 1-pentene, 2-pentene, 1-hexene, 2-hexene, benzene, toluene, xylene, and ethylbenzene. Two or more of these solvents may be used in admixture.

Examples of conjugated diene monomers that can be used in the present invention include 1,3-butadiene, isoprene, 1,3-pentadiene (piperylene), 2,3-dimethyl-1,3-butadiene, and 1,3-hexadiene. Considering the physical properties of the resulting polymer and the availability for industrial purposes, 1,3-butadiene and isoprene are preferred among these.

Examples of aromatic vinyl monomers that can be used in the present invention include styrene, α-methylstyrene, vinyltoluene, vinylnaphthalene, divinylbenzene, trivinylbenzene, and divinylnaphthalene. Considering the physical properties of the resulting polymer and the availability for industrial purposes, styrene is preferred among these.

The monomer may be the conjugated diene monomer alone or a combination of the conjugated diene monomer and the aromatic vinyl monomer. When the conjugated diene monomer and the aromatic vinyl monomer are used in combination, the ratio of these monomers ([conjugated diene monomer]/[aromatic vinyl monomer]) is preferably 50/50 to 90/10, and more preferably 55/45 to 85/15 on a mass basis. If the ratio is less than 50/50, the polymer may be insoluble in a hydrocarbon solvent, which may make it impossible to cause uniform polymerization. Conversely, if the ratio is more than 90/10, the strength of the polymer may be lowered.

The modified diene polymer is preferably one obtained by copolymerizing the conjugated diene monomer and the aromatic vinyl monomer, and particularly preferably one obtained by copolymerizing 1,3-butadiene and styrene (i.e., modified styrene-butadiene polymer). The use of such a modified diene polymer as the diene polymer (1) improves fuel economy, wet grip performance, and abrasion resistance. Further, the combined use of such modified diene polymers as the diene polymer (1) and the diene polymer (2) further improves the fuel economy and abrasion resistance while maintaining good wet grip performance, which is provided by the use of the diene polymer (1), or improving it.

The method for preparing the component (A) is not particularly limited, as long as the component (C) is used as a polymerization initiator. Conventionally known methods may be employed. Specifically, the conjugated diene monomer, or the conjugated diene monomer and the aromatic vinyl monomer is/are polymerized in an organic solvent that is inert to the reaction (e.g., a hydrocarbon solvent) using the component (C) as a polymerization initiator, optionally in the presence of a randomizer. Thus, the target active conjugated diene polymer with two chain ends terminated with an alkali metal is formed. The number average molecular weight of the resulting active conjugated diene polymer can be adjusted by varying the particular polymerization initiator (C) used, the ratio of monomer units (conjugated diene monomer, aromatic vinyl monomer), or the like.

The hydrocarbon solvent may suitably be as mentioned for the preparation of the component (C).

The randomizer refers to a compound having the function of controlling the microstructure of a conjugated diene portion of a polymer, for example, increase of 1,2-butadiene units or 3,4-isoprene units, or the function of controlling the compositional distribution of monomer units in a polymer, for example, randomization of butadiene units and styrene units in a butadiene-styrene copolymer.

The randomizer may be any compound. Considering the availability for industrial purposes, particularly ether compounds and tertiary amines are preferred. Examples of ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of tertiary amines include triethylamine, tripropylamine, and tributylamine, as well as N,N,N',N'-tetramethylethylenediamine, N,N-diethylaniline, pyridine, and quinoline.

The component (B) is a modifying agent containing a functional group. The component (B) is preferably a compound containing a functional group that contains at least one atom selected from the group consisting of nitrogen, oxygen, and silicon.

Examples of the functional groups include an amino group, amide group, alkoxysilyl group, isocyanate group, imino group, imidazole group, urea group, ether group (in particular, epoxy group), carbonyl group, carboxyl group, hydroxy group, nitrile group, pyridyl group, and diglycidylamino group. These functional groups may be substituted. Preferred among these are amino, alkoxysilyl, ether (in particular, epoxy), carbonyl, hydroxy, carboxyl, and diglycidylamino groups because they are highly reactive with silica.

The component (B) is preferably a compound represented by formula (3) below. It is preferable that a single component (B) be used (or in other words, the same modifying agent be introduced into both chain ends of the component (A)). When a single component (B) is used, the same functional group can be introduced into both chain ends of the component (A), and thus the polymer can have uniform chain ends which make the reactivity of the polymer with silica stable.

The compound represented by the formula (3) is a polyfunctional compound having two or more epoxy groups. These epoxy groups will react with the active chain ends of the active conjugated diene polymer (A). As a result of the reaction, hydroxy groups can be introduced into the polymer chain. Moreover, since the polyfunctional compound has two or more epoxy groups per molecule, one molecule of the polyfunctional compound will react with active chain ends of multiple molecules of the active conjugated diene polymer (A). As a result of the reaction, two or more polymer chains can be coupled. Thus, the resulting modified diene polymer may include ones having three or more sites (e.g. chain ends) modified with the polyfunctional compound. The balance among fuel economy, wet grip performance, and abrasion resistance can be more improved as the number of modified sites (e.g. modified chain ends) of the modified diene polymer increases.

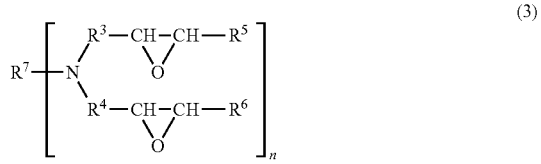

(3)

In the formula (3), $R^3$ and $R^4$ are the same as or different from each other and each represent a $C_{1-10}$ hydrocarbon group which may contain at least one selected from the group consisting of ether and tertiary amine groups; $R^5$ and $R^6$ are the same as or different from each other and each represent a hydrogen atom or a $C_{1-20}$ hydrocarbon group which may contain at least one selected from the group consisting of ether and tertiary amine groups; $R^7$ represents a $C_{1-20}$ hydrocarbon group which may contain at least one selected from the group consisting of ether, tertiary amine, epoxy, carbonyl, and halogen groups; and n represents an integer of 1 to 6.

Each of $R^3$ and $R^4$ is preferably a $C_{1-10}$ (preferably $C_{1-3}$) alkylene group. Each of $R^5$ and $R^6$ is preferably a hydrogen atom. $R^7$ may be a $C_{3-20}$ (preferably $C_{6-10}$, more preferably $C_8$) hydrocarbon group, and is preferably a cycloalkyl group, cycloalkylene group, or cycloalkanetriyl group, such as those represented by the following formulae, and more preferably a cloalkylene group.

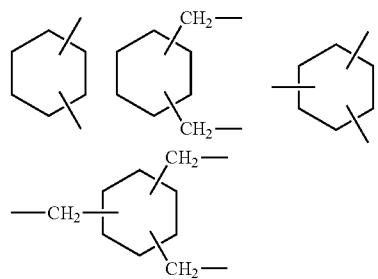

Preferably, n is 2 or 3. Suitable examples of the compound represented by the formula (3) include tetraglycidyl metaxylenediamine, tetraglycidyl aminodiphenylmethane, tetraglycidyl-p-phenylenediamine, diglycidyl aminomethylcyclohexane, and tetraglycidyl-1,3-bisaminomethylcyclohexane.

In the present invention, the diene polymer (modified diene polymer) can be formed by reacting the components (A) and (B) in an organic solvent that is inert to the reaction, such as a hydrocarbon solvent.

The hydrocarbon solvent may suitably be as mentioned for the preparation of the component (C).

The amount of the modifying agent (B) containing a functional group is preferably 0.1 to 10 mol, and more preferably 0.5 to 2 mol, per mole of the organic alkali metal compound. The use of less than 0.1 mol of the modifying agent (B) provides little improvement in fuel economy. Conversely, if the amount of the modifying agent (B) is more than 10 mol, a portion of the modifying agent (B) remains in the polymerization solvent, and there are therefore some economic disadvantages in that, for example, a step for removing the remaining portion from the solvent is necessary to recycle the solvent.

Since the reaction between the components (A) and (B) rapidly proceeds, the reaction temperature and the reaction time can be selected from wide ranges. Generally, the reaction temperature ranges from room temperature (25° C.) to 80° C. and the reaction time ranges from a few seconds to several hours. Any method may be employed for the reaction as long as the components (A) and (B) are brought into contact. In a non-limiting preferred method for the reaction, for example, the diene polymer is formed by polymerization using the component (C), and a predetermined amount of the component (B) is then added to the polymer solution.

A coupling agent represented by the general formula: $R_aMX_b$ may be added before or after the reaction between the components (A) and (B) from the viewpoint of keadability (in the formula, R represents an alkyl group, an alkenyl group, a cycloalkenyl group, or an aromatic hydrocarbon group; M represents a silicon or tin atom; X represents a halogen atom; "a" represents an integer of 0 to 2; and b represents an integer of 2 to 4). The amount of the coupling agent is preferably 0.03 to 0.4 mol, and more preferably 0.05 to 0.3 mol, per mole of the organic alkali metal compound (alkali metal catalyst) used. The use of less than 0.03 mol of the coupling agent provides little improvement in processability. Conversely, the use of more than 0.4 mol of the coupling agent reduces the number of alkali metal chain ends that can react with the modifying agent containing a functional group, and thus reduces the improvement in fuel economy.

After completion of the reaction, the modified diene polymer can be separated from the reaction solvent by a known technique, thereby giving the diene polymer (1) or (2). The diene polymers (1) and (2) can be solidified by a known technique commonly used in the production of rubber by solution polymerization (e.g., the addition of a coagulant, or steam coagulation), and then can be separated from the reaction solvent. The solidifying temperature is not limited at all.

In the case of the diene polymer (1), the solidified mass separated from the reaction solvent is preferably further dried. The solidified mass may be dried with a drier commonly used in the production of synthetic rubber, such as a band drier or an extrusion drier. The drying temperature is not limited at all.

The diene polymer (1) has a number average molecular weight (Mn) of at least 110000, preferably at least 150000, and more preferably at least 200000. The Mn of less than 110000 may result in insufficient abrasion resistance. The Mn is at most 1500000, preferably at most 1200000, more preferably at most 1000000, and still more preferably at most 600000. The Mn of more than 1500000 may result in significantly poor processability and in poor productivity due to an increase in viscosity.

The number average molecular weight (Mn) herein is measured by the method described in Examples.

The diene polymer (1) preferably has a Mooney viscosity ($ML_{1+4}$) (100° C.) of 10 to 200, more preferably 20 to 150. The upper limit of the Mooney viscosity is further more preferably not more than 100, and particularly preferably not more than 75. If the Mooney viscosity is less than 10, the vulcanizate may have reduced mechanical properties (e.g. reduced tensile strength). Conversely, if the viscosity is more than 200, the diene polymer, when combined with other rubbers, may have poor compatibility, thereby deteriorating processability. Further, the resulting vulcanized rubber composition may have reduced mechanical properties. The Mooney viscosity herein can be determined by the method described in Examples.

The vinyl content in the conjugated diene portion of the diene polymer (1) is not particularly limited, and is preferably 10 to 70 mol %, and more preferably 15 to 60 mol %. The lower limit thereof is further more preferably at least 35 mol %, particularly preferably at least 40 mol %, and most preferably at least 50 mol %. If the vinyl content is less than 10 mol %, the glass transition temperature of the polymer may be so low that when the polymer is used for tires, grip performance (wet grip performance) can be poor. Conversely, if the vinyl content is more than 70 mol %, the glass transition temperature of the polymer may be increased, possibly resulting in poor impact resilience.

The vinyl content (1,2-butadiene unit content) herein can be determined by infrared absorption spectrometry.

The amount of the diene polymer (1) based on 100% by mass of the rubber component is preferably at least 5% by mass, more preferably at least 10% by mass, still more preferably at least 40% by mass, and particularly preferably at least 50% by mass. If the amount is less than 5% by mass, the fuel economy, wet grip performance, and abrasion resistance may not be at sufficient levels. The amount of the diene polymer may be 100% by mass, and is preferably at most 90% by mass, and more preferably at most 80% by mass.

The rubber composition of the present invention may contain, in addition to the diene polymer (1), other rubber materials. Examples of other rubber materials include natural rubber (NR), butadiene rubber (BR), styrene-butadiene rubber (SBR), styrene-isoprene-butadiene rubber (SIBR), ethylene-propylene-diene rubber (EPDM), chloroprene rubber (CR), and acrylonitrile-butadiene rubber (NBR). These rubber materials may be used alone, or two or more of these may be used in combination. Preferred among these are NR and BR because they improve rubber strength and provide high abrasion resistance and high crack growth resistance.

The NR is not particularly limited, and examples thereof include those commonly used in the tire industry, such as SIR20, RSS#3, and TSR20.

When the rubber composition of the present invention contains NR, the amount of NR based on 100% by mass of the rubber component is preferably at least 5% by mass, and more preferably at least 10% by mass. If the amount is less than 5% by mass, the rubber strength may be insufficient, and the abrasion resistance and also fuel economy may be lowered. The amount of NR is preferably at most 40% by mass, and more preferably at most 30% by mass. If the amount is more than 40% by mass, grip performance (wet grip performance) may be lowered.

The BR is not particularly limited and examples thereof include BRs with a high cis content, such as BR1220 and BR1250H (ZEON Corporation), and BR130B and BR150B (Ube Industries, Ltd.); and syndiotactic polybutadiene crystal-containing BRs such as VCR412 and VCR617 (Ube Industries, Ltd.). Preferred among these are BRs having a cis content of 95% by mass or more because they have low glass transition temperatures (Tg) and provide good abrasion resistance.

When the rubber composition of the present invention contains BR, the amount of BR based on 100% by mass of the rubber component is preferably at least 5% by mass, and more preferably at least 10% by mass. If the amount is less than 5% by mass, crack growth resistance, abrasion resistance, and fuel economy may be lowered. The amount of BR is preferably at most 40% by mass, and more preferably at most 30% by mass. If the amount is more than 40% by mass, grip performance (wet grip performance) may be reduced.

The diene polymer (2) is used in the present invention. The use of the diene polymer (2) together with the diene polymer (1) further improves fuel economy and abrasion resistance while maintaining good wet grip performance, which is provided by the use of the diene polymer (1), or improving it.

The diene polymer (2) has a number average molecular weight (Mn) of at least 1000, preferably at least 1500. If the Mn is less than 1000, hysteresis loss is great and fuel economy is lowered. In addition, abrasion resistance is also lowered. The Mn is at most 100000, preferably at most 50000, more preferably at most 20000, and still more preferably at most 10000. If the Mn is more than 100000, wet grip performance is lowered.

The vinyl content in the conjugated diene portion of the diene polymer (2) is not particularly limited, and is preferably 0.1 to 70 mol %, and more preferably 0.1 to 60 mol %. If the vinyl content is less than 0.1 mol %, the crosslink density may be reduced enough to greatly reduce the tensile strength at break. Conversely, if the vinyl content is more than 70 mol %, the crosslink density may be increased enough to greatly reduce the tensile strength at break.

The amount of the diene polymer (2) per 100 parts by mass of the rubber component is at least 2 parts by mass, preferably at least 3 parts by mass, more preferably at least 5 parts by mass, and still more preferably at least 7 parts by mass. If the amount is less than 2 parts by mass, sufficient fuel economy and abrasion resistance tend not to be achieved. The amount of the diene polymer (2) is at most 25 parts by mass, preferably at most 20 parts by mass. If the amount is more than 25 parts by mass, fuel economy and processability tend to be deteriorated.

Since the diene polymer (2) has the effect of softening a rubber composition, the use of the diene polymer (2) can reduce the amount of oil in the rubber composition, further improving fuel economy and abrasion resistance.

In the rubber composition of the present invention, the amount of oil is preferably at most 50 parts by mass, more preferably at most 40 parts by mass, and still more preferably at most 30 parts by mass, per 100 parts by mass of the rubber component.

In the present invention, silica is used. The use of silica together with the diene polymers (1) and (2) synergistically improves fuel economy, wet grip performance, and abrasion resistance. The silica is not particularly limited and examples thereof include dry silica (silicic anhydride) and wet silica (hydrous silicic acid). Wet silica is preferred because it has more silanol groups.

The silica preferably has a nitrogen adsorption specific surface area ($N_2SA$) of at least 40 $m^2/g$, more preferably at least 50 $m^2/g$, further more preferably at least 100 $m^2/g$, and particularly preferably at least 150 $m^2/g$. If the $N_2SA$ is less than 40 $m^2/g$, tensile strength at break and abrasion resistance tend to be lowered. The $N_2SA$ of silica is preferably at most 250 $m^2/g$, more preferably at most 220 $m^2/g$, and further more preferably at most 200 $m^2/g$. If the $N_2SA$ is more than 250 $m^2/g$, fuel economy and processability tend to be lowered.

The nitrogen adsorption specific surface area of silica is determined by the BET method in accordance with ASTM D3037-81.

The amount of silica per 100 parts by mass of the rubber component is preferably at least 10 parts by mass, more preferably at least 20 parts by mass, and still more preferably at least 30 parts by mass. If the amount is less than 10 parts by mass, the silica used tends not to exert a sufficient effect. The amount of silica is preferably at most 150 parts by mass, more preferably at most 120 parts by mass, and still more preferably at most 100 parts by mass. If the amount is more than 150 parts by mass, the silica is less likely to disperse into the rubber composition, and thus the rubber composition tends to have deteriorated processability and abrasion resistance.

In the present invention, the silica is preferably used with a silane coupling agent. Examples of the silane coupling agents include sulfide silane coupling agents, mercapto silane coupling agents, vinyl silane coupling agents, amino silane coupling agents, glycidoxy silane coupling agents, nitro silane coupling agents, and chloro silane coupling agents. Sulfide silane coupling agents and mercapto silane coupling agents are preferred among these, and mercapto silane coupling agents are particularly preferred.

The tire rubber composition of the present invention preferably contains, as a mercapto silane coupling agent(s), a silane coupling agent represented by formula (4) below and/or a silane coupling agent containing a linking unit A represented by formula (5) below and a linking unit B represented by formula (6) below.

The use of the silane coupling agent represented by the formula (4) further improves fuel economy, wet grip performance, and abrasion resistance compared to the use of a sulfide silane coupling agent conventionally used in tire rubber compositions, such as bis(3-triethoxysilylpropyl)-tetrasulfide.

In particular, the combined use of the diene polymers (1) and (2), silica, and the silane coupling agent represented by the formula (4) synergistically improves the aforementioned properties.

(4)

In the formula (4), $R^8$ represents a group represented by the formula: $-O-(R^{12}-O)_m-R^{13}$ wherein m $R^{12}$s are the same as or different from each other and each represent a branched or unbranched $C_{1-30}$ divalent hydrocarbon group, $R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group, and m represents an integer of 1 to 30.

$R^{12}$s are the same as or different from each other and each represent a branched or unbranched $C_{1-30}$ (preferably $C_{1-10}$, more preferably $C_{1-3}$) divalent hydrocarbon group.

Examples of the hydrocarbon groups include branched or unbranched $C_{1-30}$ alkylene groups, branched or unbranched $C_{2-30}$ alkenylene groups, branched or unbranched $C_{2-30}$ alkynylene groups, and $C_{6-30}$ arylene groups. The alkylene groups are preferred among these.

Examples of the branched or unbranched $C_{1-30}$ (preferably $C_{1-10}$, more preferably $C_{1-3}$) alkylene groups for $R^{12}$ include: a methylene group, ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group.

Examples of the branched or unbranched $C_{2-30}$ (preferably $C_{2-10}$, more preferably $C_{2-5}$) alkenylene groups for $R^{12}$ include: a vinylene group, 1-propenylene group, 2-propenylene group, 1-butenylene group, 2-butenylene group, 1-pentenylene group, 2-pentenylene group, 1-hexenylene group, 2-hexenylene group, and 1-octenylene group.

Examples of the branched or unbranched $C_{2-30}$ (preferably $C_{2-10}$, more preferably $C_{2-5}$) alkynylene groups for $R^{12}$ include: an ethynylene group, propynylene group, butynylene group, pentynylene group, hexynylene group, heptynylene group, octynylene group, nonynylene group, decynylene group, undecynylene group, and dodecynylene group.

Examples of the $C_{6-30}$ (preferably $C_{6-10}$) arylene groups for $R^{12}$ include a phenylene group, tolylene group, xylylene group, and naphthylene group.

The symbol "m" represents an integer of 1 to 30 (preferably 2 to 10, more preferably 3 to 7, and still more preferably 5 or 6). If m is 0, the silane coupling agent is less likely to get close to silica, and thus the reaction between the silane coupling agent and silica is less likely to occur. If m is 31 or more, the molecules of the silane coupling agent tend to aggregate and thus the silane coupling agent is less likely to get close to silica. As a result, the reaction between the silane coupling agent and silica is less likely to occur.

$R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group. In particular, $R^{13}$ is preferably a branched or unbranched $C_{1-30}$ alkyl group because of less steric hindrance.

Examples of the branched or unbranched $C_{1-30}$ (preferably $C_{5-25}$, more preferably $C_{10-15}$) alkyl groups for $R^{13}$ include: a methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, nonyl group, decyl group, undecyl group, dodecyl group, tridecyl group, tetradecyl group, pentadecyl group, and octadecyl group.

Examples of the branched or unbranched $C_{2-30}$ (preferably $C_{5-25}$, more preferably $C_{10-15}$) alkenyl groups for $R^{13}$ include: a vinyl group, 1-propenyl group, 2-propenyl group, 1-butenyl group, 2-butenyl group, 1-pentenyl group, 2-pentenyl group, 1-hexenyl group, 2-hexenyl group, 1-octenyl group, decenyl group, undecenyl group, dodecenyl group, tridecenyl group, tetradecenyl group, pentadecenyl group, and octadecenyl group.

Examples of the $C_{6-30}$ (preferably $C_{10-25}$) aryl groups for $R^{13}$ include a phenyl group, tolyl group, xylyl group, naphthyl group, and biphenyl group.

Examples of the $C_{7-30}$ (preferably $C_{10-25}$) aralkyl groups for $R^{13}$ include a benzyl group and phenethyl group.

Specific examples of the $R^8$ group in the formula (4) include: $-O-(C_2H_4O)_5-C_{11}H_{23}$, $-O-(C_2H_4-O)_5-C_{12}H_{25}$, $-O-(C_2H_4-O)_5-C_{13}H_{27}$, $-O-(C_2H_4O)_5-C_{14}H_{29}$, $-O-(C_2H_4O)_5-C_{15}H_{31}$, $-O-(C_2H_4O)_3-C_{13}H_{27}$, $-O-(C_2H_4O)_4-C_{13}H_{27}$, $-O-(C_2H_4O)_6-C_{13}H_{27}$, and $-O-(C_2H_4-O)_7-C_{13}H_{27}$. Preferred among these are: $-O-(C_2H_4O)_5-C_{11}H_{23}$, $-O-(C_2H_4-O)_5-C_{13}H_{27}$, $-O-(C_2H_4-O)_5-C_{15}H_{31}$, and $-O-(C_2H_4-O)_6-C_{13}H_{27}$.

$R^9$ and $R^{10}$ are the same as or different from each other and each represent a group as defined for $R^8$ (i.e. a group represented by the formula: $-O-(R_{12}-O)_m-R^{13}$), or a branched or unbranched $C_{1-12}$ alkyl group or a group represented by the formula: $-O-R^{14}$ where $R^{14}$ represents a hydrogen atom, a branched or unbranched $C_{1-30}$ alkyl group, a branched or unbranched $C_{2-30}$ alkenyl group, a $C_{6-30}$ aryl group, or a $C_{7-30}$ aralkyl group. Each of $R^9$ and $R^{10}$ is preferably a group as defined for $R^8$, or a group represented by the formula: $-O-R^{14}$ where $R^{14}$ represents a branched or unbranched $C_{1-30}$ alkyl group, because of higher probability of the contact with silica.

Examples of the branched or unbranched $C_{1-12}$ alkyl groups for $R^9$ and $R^{10}$ include: a methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, and nonyl group.

Examples of the branched or unbranched $C_{1-30}$ (preferably $C_{1-10}$, more preferably $C_{1-3}$) alkyl groups for $R^{14}$ include those listed above for the branched or unbranched $C_{1-30}$ alkyl groups for $R^{13}$.

Examples of the branched or unbranched $C_{2-30}$ alkenyl groups for $R^{14}$ include those listed above for the branched or unbranched $C_{2-30}$ alkenyl groups for $R^{13}$.

Examples of the $C_{6-30}$ aryl groups for $R^{14}$ include those listed above for the $C_{6-30}$ aryl groups for $R^{13}$.

Examples of the $C_{7-30}$ aralkyl groups for $R^{14}$ include those listed above for the $C_{7-30}$ aralkyl groups for $R^{13}$.

Specific examples of the $R^9$ and $R^{10}$ groups in the formula (4) include: $-O-(C_2H_4-O)_5-C_{11}H_{23}$, $-O-(C_2H_4-O)_5-C_{12}H_{25}$, $-O-(C_2H_4-O)_5-C_{13}H_{27}$, $-O-(C_2H_4O)_5-C_{14}H_{29}$, $-O-(C_2H_4O)_5-C_{15}H_{31}$, $-O-(C_2H_4-O)_3-C_{13}H_{27}$, $-O-(C_2H_4O)_4-C_{13}H_{27}$ $(C_2H_4-O)_6-C_{13}H_{27}$, $-O-(C_2H_4-O)_7-C_{13}H_{27}$, $C_2H_5-O-$, $CH_3-O-$, and $C_3H_7-O-$. Preferred among these are: $-O-(C_2H_4-O)_5-C_{11}H_{23}$, $-O-(C_2H_4O)_5-C_{13}H_{27}$, $-O-(C_2H_4-O)_5-C_{15}H_{31}$, $-O-(C_2H_4-O)_6-C_{13}H_{27}$, and $C_2H_5-O-$.

Examples of the branched or unbranched $C_{1-30}$ (preferably $C_{1-10}$, more preferably $C_{1-5}$) alkylene groups for $R^{11}$ include those listed above for the branched or unbranched $C_{1-30}$ alkylene groups for $R^{12}$.

Examples of the silane coupling agents represented by the formula (4) include Si363 (Evonik Degussa). Such silane coupling agents may be used alone, or two or more of these may be used in combination.

The use of the silane coupling agent containing a linking unit A represented by formula (5) below and a linking unit B represented by formula (6) below further improves fuel economy, wet grip performance and abrasion resistance compared to the use of a sulfide silane coupling agent conventionally used in tire rubber compositions, such as bis(3-triethoxysilylpropyl)tetrasulfide. In particular, the combined use of the diene polymers (1) and (2), silica, and the silane coupling agent containing a linking unit A represented by the formula (5) and a linking unit B represented by the formula (6) synergistically improves the aforementioned properties.

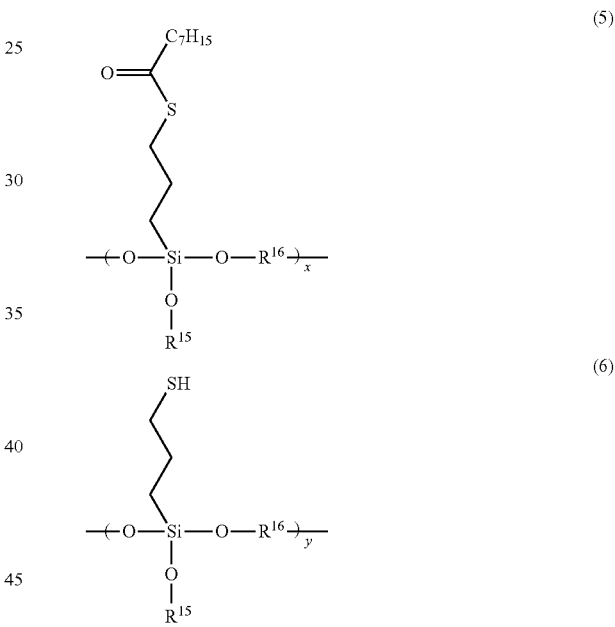

In the formulae (5) and (6), $R^{15}$ represents hydrogen, a halogen, a branched or unbranched $C_{1-30}$ alkyl group, a branched or unbranched $C_{2-30}$ alkenyl group, a branched or unbranched $C_{2-30}$ alkynyl group, or a group obtained by replacing a terminal hydrogen of the alkyl group with a hydroxy or carboxyl group; and $R^{16}$ represents a branched or unbranched $C_{1-30}$ alkylene group, a branched or unbranched $C_{2-30}$ alkenylene group, or a branched or unbranched $C_{2-30}$ alkynylene group, provided that $R^{15}$ and $R^{16}$ together may form a ring.

The silane coupling agent with the above structure, which contains the linking unit A and the linking unit B, suppresses an increase in viscosity during processing as compared to polysulfide silanes such as bis-(3-triethoxysilylpropyl)tetrasulfide. This is presumably for the following reason. Since the sulfide moiety of the linking unit A is a C—S—C bond, the sulfide moiety is thermally stable compared with tetrasulfide or disulfide. Accordingly, the increase in Mooney viscosity will be small.

In the case of using the silane coupling agent containing the linking unit A and the linking unit B, the reduction in scorch time is suppressed compared with mercaptosilanes such as 3-mercaptopropyltrimethoxysilane. This is presumably for the following reason. Although the linking unit B has a mercaptosilane structure, the —SH group of the linking unit B is covered with the —$C_7H_{15}$ moiety of the linking unit A. Accordingly, the —SH group is less likely to react with polymers, so that scorching is less likely to occur. Thus, the deterioration of abrasion resistance can be prevented, and a balanced improvement in fuel economy, wet grip performance and abrasion resistance can therefore be achieved.

With the aim of achieving the effects of the present invention well, the linking unit A content in the silane coupling agent with the above structure is preferably at least 30 mol %, more preferably at least 50 mol %, and is preferably at most 99 mol %, more preferably at most 90 mol %. The linking unit B content is preferably at least 5 mol %, more preferably at least 10 mol %, and is preferably at most 65 mol %, more preferably at most 55 mol %. The combined content of the linking units A and B is preferably at least 95 ml %, more preferably at least 98 mol %, and particularly preferably 100 mol %.

The linking unit A or B content refers to the content including the linking unit A or B located at a chain end of the silane coupling agent, if present. In the case that the linking unit A or B is, located at a chain end of the silane coupling agent, the form of this linking unit is not particularly limited as long as it forms a unit corresponding to the formula (5) or (6) representing the linking unit A or B.

Examples of the halogens for $R^{15}$ include chlorine, bromine, and fluorine.

Examples of the branched or unbranched $C_{1-30}$ alkyl groups for $R^{15}$ include a methyl group, ethyl group, n-propyl group, isopropyl group, n-butyl group, iso-butyl group, sec-butyl group, tert-butyl group, pentyl group, hexyl group, heptyl group, 2-ethylhexyl group, octyl group, nonyl group, and decyl group. The carbon number of the alkyl group is preferably 1 to 12.

Examples of the branched or unbranched $C_{2-30}$ alkenyl groups for $R^{15}$ include a vinyl group, 1-propenyl group, 2-propenyl group, 1-butenyl group, 2-butenyl group, 1-pentenyl group, 2-pentenyl group, 1-hexenyl group, 2-hexenyl group, and 1-octenyl group. The carbon number of the alkenyl group is preferably 2 to 12.

Examples of the branched or unbranched $C_{2-30}$ alkynyl groups for $R^{15}$ include an ethynyl group, propynyl group, butynyl group, pentynyl group, hexynyl group, heptynyl group, octynyl group, nonynyl group, decynyl group, undecynyl group, and dodecynyl group. The carbon number of the alkynyl group is preferably 2 to 12.

Examples of the branched or unbranched $C_{1-30}$ alkylene groups for $R^{16}$ include an ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group. The carbon number of the alkylene group is preferably 1 to 12.

Examples of the branched or unbranched $C_{2-30}$ alkenylene groups for $R^{16}$ include a vinylene group, 1-propenylene group, 2-propenylene group, 1-butenylene group, 2-butenylene group, 1-pentenylene group, 2-pentenylene group, 1-hexenylene group, 2-hexenylene group, and 1-octenylene group. The carbon number of the alkenylene group is preferably 2 to 12.

Examples of the branched or unbranched $C_{2-30}$ alkynylene groups for $R^{16}$ include an ethynylene group, propynylene group, butynylene group, pentynylene group, hexynylene group, heptynylene group, octynylene group, nonynylene group, decynylene group, undecynylene group, and dodecynylene group. The carbon number of the alkynylene group is preferably 2 to 12.

In the silane coupling agent with the above structure, the total number of repetitions (x+y) including the number of repetitions (x) of the linking unit A and the number of repetitions (y) of the linking unit B preferably ranges from 3 to 300. Within the range mentioned above, the —$C_7H_{15}$ moiety of the linking unit A covers the mercaptosilane of the linking unit B, which suppresses the reduction in scorch time and ensures good reactivity with silica or the rubber component.

Examples of the silane coupling agents having the above structure include NXT-Z30, NXT-Z45, and NXT-Z60 (Momentive Performance Materials). These may be used alone, or two or more of these may be used in combination.

The amount of the silane coupling agent represented by the formula (4) and/or the silane coupling agent containing a linking unit A represented by the formula (5) and a linking unit B represented by the formula (6) is preferably at least 1 part by mass, more preferably at least 5 parts by mass, and still more preferably at least 7 parts by mass, per 100 parts by mass of silica. If the amount is less than 1 part by mass, the tensile strength at break and abrasion resistance tend to be greatly lowered. The amount is preferably at most 15 parts by mass, and more preferably at most 10 parts by mass, per 100 parts by mass of silica. If the amount is more than 15 parts by mass, the effects of the silane coupling agent(s) added, such as increase in tensile strength at break and abrasion resistance and decrease in rolling resistance, tend not to be sufficiently exerted.

In the case that the silane coupling agent represented by the formula (4) and the silane coupling agent containing a linking unit A represented by the formula (5) and a linking unit B represented by the formula (6) are used in combination, the amount means the combined amount of these silane coupling agents.

In the present invention, in the case that another silane coupling agent such as a sulfide silane coupling agent is used, the combined amount of the silane coupling agents used is preferably within the range mentioned above.

The rubber composition of the present invention preferably contains carbon black. The carbon black provides good reinforcement, thereby further improving abrasion resistance.

The carbon black is not particularly limited, and examples thereof include GPF, HAF, ISAF, and SAF.

The carbon black preferably has a nitrogen adsorption specific surface area ($N_2SA$) of at least 30 $m^2/g$, more preferably at least 70 $m^2/g$, and still more preferably at least 100 $m^2/g$. If the $N_2SA$ is less than 30 $m^2/g$, sufficient reinforcement tends not to be provided. The $N_2SA$ of carbon black is preferably at most 250 $m^2/g$, more preferably at most 150 $m^2/g$, and still more preferably at most 125 $m^2/g$. If the $N_2SA$ is more than 250 $m^2/g$, the viscosity of the rubber composition before vulcanization tends to be very high, thereby resulting in poor processability. The fuel economy also tends to be deteriorated.

The nitrogen adsorption specific surface area of carbon black is measured in conformity with JIS K6217-2:2001.

The carbon black preferably has a dibutyl phthalate (DBP) oil absorption of at least 70 ml/100 g, and more preferably at least 90 ml/100 g. The DBP oil absorption of carbon black is preferably at most 160 ml/100 g, and more preferably at most 125 ml/100 g. The DBP oil absorption within the range mentioned above leads to a balanced improvement in fuel economy, wet grip performance, and abrasion resistance.

The DBP oil absorption of carbon black is measured in conformity with JIS K6217-4: 2001.

In the case where the rubber composition of the present invention contains carbon black, the amount of carbon black per 100 parts by mass of the rubber component is preferably at least 5 parts by mass, and more preferably at least 8 parts by mass. If the amount is less than 5 parts by mass, the effect of carbon black used may not be sufficiently exerted. The amount of carbon black is preferably at most 60 parts by mass, more preferably at most 20 parts by mass, and still more preferably at most 15 parts by mass. If the amount is more than 60 parts by mass, fuel economy tends to be deteriorated.

The silica content based on 100% by mass in total of silica and carbon black is preferably at least 60% by mass, more preferably at least 80% by mass, and is preferably at most 98% by mass, more preferably at most 95% by mass. Within the range mentioned above, a balanced improvement in fuel economy, wet grip performance, and abrasion resistance can be achieved at high levels.

A vulcanization accelerator may be used in the present invention. Examples of usable vulcanization accelerators include: sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Preferred among these are sulfenamide vulcanization accelerators because they enable high initial cure rate.

Examples of the sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ). TBBS and CBS are preferred among these.

Generally, in the case where a silane coupling agent containing a mercapto group is used, though the fuel economy is highly improved, there are the problems that scorching is caused and the abrasion resistance is deteriorated.

In the present invention, the use of a vulcanization accelerator represented by formula (7) below suppresses scorching and provides a balanced improvement in fuel economy, wet grip performance and abrasion resistance even when a silane coupling agent containing a mercapto group is used. In other words, the combined use of a silane coupling agent represented by the formula (4) and a vulcanization accelerator represented by the formula (7) prevents the deterioration of abrasion resistance and provides a balanced improvement in fuel economy, wet grip performance and abrasion resistance while maintaining the effects of improving wet grip performance and fuel economy, which are due to the use of the silane coupling agent represented by the formula (4), at high levels.

Moreover, in the case where the silane coupling agent containing a linking unit A represented by the formula (5) and a linking unit B represented by the formula (6) and a vulcanization accelerator represented by the formula (7) are used in combination, the vulcanization accelerator represented by the formula (7) and the linking units A together synergistically suppress scorching and provide a balanced improvement in fuel economy, wet grip performance and abrasion resistance.

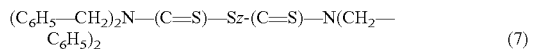
(7)

The symbol "z" in the formula (7) represents an integer of 1 to 8 (preferably 1 to 6, and more preferably 1 to 3).

Examples of the vulcanization accelerators represented by the formula (7) include NOCCELER TBzTD (tetrabenzylthiuram disulfide) and NOCCELER TOT-N (tetrakis(2-ethylhexyl)thiuram disulfide) produced by OUCHI SHINKO CHEMICAL INDUSTRIAL CO., LTD. These may be used alone, or two or more of these may be used in combination.

The amount of vulcanization accelerator per 100 parts by mass of the rubber component is preferably at least 0.1 parts by mass, and more preferably at least 0.2 parts by mass. If the amount is less than 0.1 parts by mass, the cure rate tends to be slow. The amount is preferably at most 10 parts by mass, more preferably at most 5 parts by mass, and still more preferably at most 3 parts by mass. If the amount is more than 10 parts by mass, blooming may be caused.

In addition to the aforementioned ingredients, the rubber composition of the present invention may optionally contain compounding ingredients commonly used in the preparation of rubber compositions. Examples of compounding ingredients include reinforcing fillers such as clay; zinc oxide; stearic acid; various antioxidants; oils such as aromatic oils; waxes; vulcanizing agents such as sulfur; and vulcanization accelerators.

Commonly known methods can be employed as the method for preparing the rubber composition of the present invention. For example, the rubber composition may be prepared by mixing and kneading the ingredients mentioned above with a rubber kneader such as an open roll mill or a Banbury mixer, and then vulcanizing the mixture.

The rubber composition of the present invention can be suitably used for various components of a tire (in particular, a tread).

The pneumatic tire of the present invention can be produced by an ordinary method using the above-mentioned rubber composition. Specifically, an unvulcanized rubber composition to which various additives are optionally added is extruded and processed into the shape of a tire component (in particular, a tread), and then arranged in a usual manner on a tire building machine and assembled with other tire components to build an unvulcanized tire. Then, the unvulcanized tire is heated and pressed in a vulcanizer to provide a tire.

The tire of the present invention can be suitably used for passenger vehicles, busses, trucks, and the like.

EXAMPLES

The present invention will be more specifically described with reference to examples, but the present invention is not limited to these examples.

In the following, the chemical agents used in preparation examples are listed. The chemical agents were optionally purified by a common method.

Cyclohexane: product of Tokyo Chemical Industry Co., Ltd. (purity: 99.5% or higher)

Styrene: product of Tokyo Chemical Industry Co., Ltd. (purity: 99% or higher)

1,3-Butadiene: product of Tokyo Chemical Industry Co., Ltd.

N,N,N',N'-Tetramethylethylenediamine: product of Wako Pure Chemical Industries, Ltd.

n-Butyllithium: product of Wako Pure Chemical Industries, Ltd.

Solution of 1,3-divinylbenzene in hexane (1.6 M): product of Tokyo Chemical Industry Co., Ltd.

Isopropanol: product of Wako Pure Chemical Industries, Ltd.

2,6-tert-Butyl-p-cresol: product of Wako Pure Chemical Industries, Ltd.

Tetraglycidyl-1,3-bisaminomethylcyclohexane: product of Wako Pure Chemical Industries, Ltd. (the compound represented by the following formula (modifying agent))

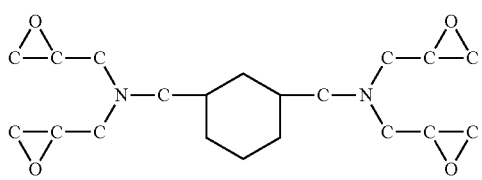 [SMILES: C1CC(CN(CC2CO2)CC2CO2)CC(CN(CC2CO2)CC2CO2)C1]

Methanol: product of Kanto Chemical Co., Inc.

Preparation Example 1

Preparation of Polymerization Initiator

To a 100 ml pressure-resistant vessel in which the air was sufficiently substituted with nitrogen was added 10 ml of a solution of 1,3-divinylbenzene in hexane (1.6 M). Then, 20 ml of a solution of n-butyllithium in hexane (1.6 M) was dropwise added at 0° C. and the resulting mixture was stirred for one hour. Thus, a polymerization initiator solution was prepared.

Preparation Example 2

Preparation of Diene Polymer (A) (Modified Diene Polymer (Corresponding to the Diene Polymer (1)))

To a 1000 ml pressure-resistant vessel in which the air was sufficiently substituted with nitrogen were added 600 ml of cyclohexane, 0.12 mol of styrene, 0.8 mol of 1,3-butadiene, and 0.023 mmol of N,N,N',N'-tetramethylethylenediamine. To the mixture was added 0.05 ml of the polymerization initiator solution prepared in Preparation Example 1, and the resulting mixture was stirred at 40° C. After three hours, 0.033 mmol of tetraglycidyl-1,3-bisaminomethylcyclohexane, which is a modifying agent, was added thereto and the resulting mixture was stirred. After one hour, 3 ml of isopropanol was added to terminate the polymerization. After adding 1 g of 2,6-tert-butyl-p-cresol to the reaction solution, the solution was subjected to reprecipitation with methanol, and the precipitate was heated and dried to give a diene polymer (A) (modified diene polymer (corresponding to the diene polymer (1)) having two or more modified moieties (e.g. modified chain ends)).

Preparation Example 3

Preparation of Diene Polymer (B) (Modified Diene Polymer (Corresponding to the Diene Polymer (2)))

To a 1000 ml pressure-resistant vessel in which the air was sufficiently substituted with nitrogen were added 600 ml of cyclohexane, 0.12 mol of styrene, 0.80 mol of 1,3-butadiene, and 2.333 mmol of N,N,N',N'-tetramethylethylenediamine. To the mixture was added 5 ml of the polymerization initiator solution prepared in Preparation Example 1, and the resulting mixture was stirred at 40° C. After three hours, 3.33 mmol of tetraglycidyl-1,3-bisaminomethylcyclohexane, which is a modifying agent, was added thereto and the resulting mixture was stirred. After one hour, 3 ml of isopropanol was added to terminate the polymerization. After adding 1 g of 2,6-tert-butyl-p-cresol to the reaction solution, the same procedure was followed as in Preparation Example 2 to give a diene polymer (B) (modified diene polymer (corresponding to the diene polymer (2)) having two or more modified moieties (e.g. modified chain ends)).

Preparation Example 4

Preparation of Diene Polymer (C)

A diene polymer (C) was produced in the same manner as in Preparation Example 3, except that the amount of N,N,N',N'-tetramethylethylenediamine was changed to 0.047 mmol, the amount of the polymerization initiator solution was changed to 0.1 ml, and the amount of tetraglycidyl-1,3-bisaminomethylcyclohexane was changed to 0.067 mmol.

Preparation Example 5

Preparation of Diene Polymer (D)

A diene polymer (D) was produced in the same manner as in Preparation Example 3, except that the amount of N,N,N',N'-tetramethylethylenediamine was changed to 13.997 mmol, the amount of the polymerization initiator solution was changed to 30 ml, and the amount of tetraglycidyl-1,3-bisaminomethylcyclohexane was changed to 20 mmol.

The prepared diene polymers (A) to (D) were evaluated as follows. Measurement of the Mooney viscosity was only performed on the diene polymer (A).

(Mooney Viscosity)

The Mooney viscosity ($ML_{1+4}/100°$ C.) of each diene polymer was determined in accordance with JIS K 6300-1 "Rubber, unvulcanized—Physical property—Part 1: Determination of Mooney viscosity and pre-vulcanization characteristics with Mooney viscometer". That is, a Mooney viscosity tester was preheated for one minute up to 100° C. and a small rotor was rotated under this temperature condition. After four-minute rotation, the Mooney viscosity was determined. Here, the obtained values were rounded to the nearest whole number. The Mooney viscosity of the diene polymer (A) was found to be 60.

(Vinyl Content)

The vinyl content of each diene polymer was determined by infrared absorption spectrometry. The vinyl contents of the diene polymers (A), (B), (C), and (D) were found to be 57 mol %, 57 mol %, 57 mol %, and 57 mol %, respectively.

(Measurement of Number Average Molecular Weight (Mn))

The Mn was determined by gel permeation chromatography (GPC) (GPC-8000 series produced by TOSOH CORPORATION; detector: differential refractometer; column: TSK-GEL SUPERMALTPORE HZ-M produced by TOSOH CORPORATION) relative to polystyrene standards. The Mn values of the diene polymers (A), (B), (C), and (D) were found to be 300000, 3000, 150000, and 500, respectively.

In the following, the chemical agents used in examples and comparative examples are listed.

Diene polymers (A) to (D): diene polymers (A) to (D) prepared in Preparation Examples 2 to 5

SBR: E15 (S-SBR coupled with an epoxy group-containing compound (tetraglycidyl-1,3-bisaminomethylcyclohexane), styrene unit content: 23% by mass, vinyl unit content: 64% by mass, end group: OH (one chain end-modified SBR), Asahi Kasei Chemicals Corp.)

BR: Nipol BR1220 (cis content: 97% by mass, Zeon Corp.)

NR: RSS#3

Carbon black: Diablack N220 (N220, $N_2SA$: 114 $m^2/g$, DBP oil absorption: 114 ml/100 g, Mitsubishi Chemical Corp.)

Silica: Ultrasil VN3 ($N_2SA$: 175 $m^2/g$, Evonik Degussa)

Silane coupling agent (1): Si69 (bis(3-triethoxysilylpropyl)tetrasulfide, Evonik Degussa)

Silane coupling agent (2): NXT-Z45 (copolymer of linking unit A and linking unit B (linking unit A: 55 mol %, linking unit B: 45 mol %), Momentive Performance Materials)

Zinc oxide: Zinc Oxide #1 (Mitsui Mining & Smelting Co., Ltd.)
Stearic acid: stearic acid "Tsubaki" (NOF Corp.)
Aromatic oil: Process X-140 (JX Nippon Oil & Energy Corporation)
Antioxidant: Antigene 6C (N-(1,3-dimethylbutyl)-N'-phenyl-p-phenylenediamine, Sumitomo Chemical Co., Ltd.)
Wax: SUNNOC N (Ouchi Shinko Chemical Industrial Co., Ltd.)
Sulfur: sulfur powder (Karuizawa Iou K.K.)
Vulcanization accelerator (1): Nocceler NS (N-tert-butyl-2-benzothiazolylsulfenamide, Ouchi Shinko Chemical Industrial Co., Ltd.)
Vulcanization accelerator (2): Soxinol D (Sumitomo Chemical Co., Ltd.)

EXAMPLES AND COMPARATIVE EXAMPLES

The chemical agents in formulation amounts shown in Table 1, except the sulfur and vulcanization accelerators, were mixed and kneaded with a Banbury mixer at 165° C. for four minutes to provide a kneaded mixture. To the kneaded mixture were added the sulfur and vulcanization accelerators and then the resulting mixture was kneaded with an open roll mill at 80° C. for four minutes to provide an unvulcanized rubber composition. Then, the unvulcanized rubber composition was formed into a tread shape, assembled with other tire components, and vulcanized at 150° C. for 35 minutes at 25 kgf to prepare a test tire (tire size: 195/65R15).

Each test tire was evaluated as follows. The results are shown in Table 1. Here, Comparative Example 1 is employed as the standard comparative example.

(Fuel Economy)

Using a rolling resistance tester, the rolling resistance of each test tire was determined by running the tire with a rim of 15×6JJ at an internal pressure of 230 kPa, a load of 3.43 kN, and a speed of 80 km/h. The result of each tire is expressed as an index relative to a value of 100 representing the rolling resistance of the standard comparative example. A higher index indicates better fuel economy.

(Wet Grip Performance)

The wet grip performance was evaluated based on the braking performance determined by an Anti-Lock Brake System (ABS) evaluation test. Specifically, each set of test tires was mounted on a 1800-cc class passenger vehicle equipped with an ABS, and the vehicle was driven on an asphalt road (condition of road surface: wet, skid number: approximately 50). Then, the brake was stepped on when the speed was 100 km/h, and the distance traveled until the vehicle stopped (stopping distance) was measured. The stopping distance of each formulation is expressed as a wet grip performance index relative to that of the standard comparative example (=100), using the following equation. A higher wet grip performance index indicates better braking performance on a wet road, that is, better wet grip performance.

(Wet grip performance index)=(stopping distance of standard comparative example)/(stopping distance of each formulation)×100

(Abrasion Resistance)

Each set of test tires was mounted on a 1800-cc class passenger vehicle equipped with an ABS, and the decrease in the groove depth was measured after the vehicle had run 30000 km in a city area. Then, the mileage at which the groove depth was decreased by 1 mm was calculated. Further, the result of the decrease in the groove depth of each formulation is expressed as an abrasion resistance index relative to that of the standard comparative example (=100), using the following equation. A higher abrasion resistance index indicates better abrasion resistance.

(Abrasion resistance index)=(the mileage at which the groove depth was decreased by 1 mm in each formulation)/(the mileage at which the groove depth was decreased by 1 mm in the tire of standard comparative example)×100

TABLE 1

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Formulation amount (part(s) by mass) | Diene polymer (A) | 60 | 60 | 60 | 60 | 60 | — | 60 | 60 | 60 | — |
| | SBR | — | — | — | — | — | 60 | — | — | — | 60 |
| | BR | 20 | 20 | 20 | 20 | 20 | 20 | 20 | 20 | 20 | 20 |
| | NR | 20 | 20 | 20 | 20 | 20 | 20 | 20 | 20 | 20 | 20 |
| | Silica | 80 | 80 | 80 | 80 | 80 | 80 | 80 | 80 | 80 | 80 |
| | Crabon black | 10 | 10 | 10 | 10 | 10 | 10 | 10 | 10 | 10 | 10 |
| | Silane coupling agent 1 | 6 | 6 | 6 | — | 6 | 6 | 6 | 6 | 6 | 6 |
| | Silane coupling agent 2 | — | — | — | 6 | — | — | — | — | — | — |
| | Zinc oxide | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 |
| | Wax | 2 | 2 | 2 | 2 | 2 | 2 | 2 | 2 | 2 | 2 |
| | Diene polymer (B) | 5 | 10 | 25 | 10 | — | — | — | — | 30 | 10 |
| | Diene polymer (C) | — | — | — | — | — | — | 15 | — | — | — |
| | Diene polymer (D) | — | — | — | — | — | — | — | 15 | — | — |
| | Aromatic oil | 25 | 20 | 5 | 20 | 30 | 30 | 15 | 15 | — | 20 |
| | Sulfur | 1.8 | 1.8 | 1.8 | 1.8 | 1.8 | 1.8 | 1.8 | 1.8 | 1.8 | 1.8 |
| | Vulcanization accelerator 1 | 1.7 | 1.7 | 1.7 | 1.7 | 1.7 | 1.7 | 1.7 | 1.7 | 1.7 | 1.7 |
| | Vulcanization accelerator 2 | 2 | 2 | 2 | 2 | 2 | 2 | 2 | 2 | 2 | 2 |
| Evaluation | Fuel economy | 105 | 102 | 100 | 113 | 100 | 90 | 110 | 90 | 95 | 92 |
| | Wet grip performance | 100 | 103 | 105 | 107 | 100 | 95 | 96 | 105 | 108 | 97 |
| | Abrasion resistance | 105 | 110 | 115 | 118 | 100 | 95 | 110 | 96 | 116 | 105 |

Table 1 shows that the fuel economy and abrasion resistance were improved while good wet grip performance was maintained or improved in the examples in which the rubber composition contained a rubber component including a specific modified diene polymer (1) having a specific number average molecular weight, silica, and a specific modified diene polymer (2) having a specific number average molecular weight in a specific amount.

Comparison of Comparative Examples 1, 2, and 6 and Example 2 demonstrated that the combined use of the diene polymer (1) and the diene polymer (2) synergistically improves wet grip performance.

The invention claimed is:

1. A tire rubber composition, comprising:
a rubber component comprising: a diene polymer (1);
silica; and
a diene polymer (2),
the diene polymers (1) and (2) each being a modified diene polymer obtained by reacting a component (A) and a component (B),
the diene polymer (1) having a number average molecular weight of 110000 to 1500000,
the diene polymer (2) having a number average molecular weight of 1000 to 100000,
an amount of the diene polymer (2) being 2 to 25 parts by mass per 100 parts by mass of the rubber component,
wherein the component (A) is an active alkali metal-terminated conjugated diene polymer obtained by polymerizing a conjugated diene monomer alone or with an aromatic vinyl monomer, in the presence of a component (C),
the component (B) is a compound represented by the following formula (3):

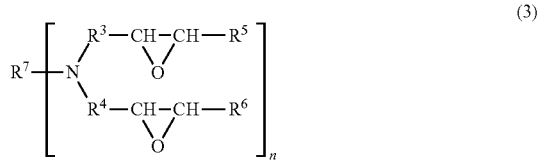

wherein $R^3$ and $R^4$ are the same as or different from each other and each represent a $C_{1-10}$ hydrocarbon group which may contain at least one selected from the group consisting of ether and tertiary amine groups; $R^5$ and $R^6$ are the same as or different from each other and each represent a hydrogen atom or a $C_{1-20}$ hydrocarbon group which may contain at least one selected from the group consisting of ether and tertiary amine groups; $R^7$ represents a $C_{1-20}$ hydrocarbon group which may contain at least one selected from the group consisting of ether, tertiary amine, epoxy, carbonyl, and halogen groups; and n represents an integer of 1 to 6, and
the component (C) is a chemical species obtained by reacting an organic alkali metal compound with a compound represented by the following formula (1):

wherein $R^1$ and $R^2$ are the same as or different from each other and each represent a hydrogen atom, a branched or unbranched alkyl group, a branched or unbranched aryl group, a branched or unbranched alkoxy group, a branched or unbranched silyloxy group, a branched or unbranched acetal group, a carboxyl group, a mercapto group, or a derivative thereof; and A represents a branched or unbranched alkylene group, a branched or unbranched arylene group, or a derivative thereof.

2. The tire rubber composition according to claim 1, wherein the compound represented by the formula (1) is a compound represented by the following formula (2):

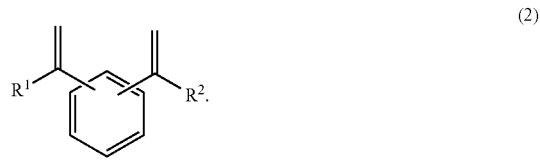

3. The tire rubber composition according to claim 1, wherein the same compound is introduced into both chain ends of the active conjugated diene polymer.

4. The tire rubber composition according to claim 1, wherein an amount of the diene polymer (1) is at least 5% by mass based on 100% by mass of the rubber component.

5. The tire rubber composition according to claim 1, wherein the conjugated diene monomer is at least one of 1,3-butadiene and isoprene, and
the aromatic vinyl monomer is styrene.

6. The tire rubber composition according to claim 1, wherein the modified diene polymer is a modified styrene butadiene polymer obtained by polymerizing 1,3-butadiene and styrene.

7. The tire rubber composition according to claim 1, wherein the silica has a nitrogen adsorption specific surface area of 40 to 250 m$^2$/g.

8. The tire rubber composition according to claim 1, comprising at least one of
a silane coupling agent represented by the following formula (4), and
a silane coupling agent that contains a linking unit A represented by the following formula (5) and a linking unit B represented by the following formula (6),

wherein $R^8$ represents a group represented by —O—($R^{12}$—O)$_m$—$R^{13}$ where m $R^{12}$s are the same as or different from each other and each represent a branched or unbranched $C_{1-30}$ divalent hydrocarbon group, $R^{13}$ represents a branched or unbranched $C_{1-30}$ alkyl group, a branched or unbranched $C_{2-30}$ alkenyl group, a $C_{6-30}$ aryl group, or a $C_{7-30}$ aralkyl group, and m represents an integer of 1 to 30; $R^9$ and $R^{10}$ are the same as or different from each other and each represent a group as defined for $R^8$, or a branched or unbranched $C_{1-12}$ alkyl group or a group represented by —O—$R^{14}$ where $R^{14}$ represents a hydrogen atom, a branched or unbranched $C_{1-30}$ alkyl group, a branched or unbranched $C_{2-30}$ alkenyl group, a $C_{6-30}$ aryl group, or a $C_{7-30}$ aralkyl group; and $R^{11}$ represents a branched or unbranched $C_{1-30}$ alkylene group;

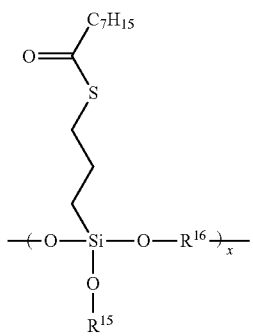

(5)

-continued

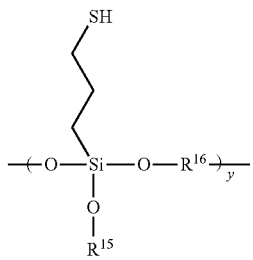

(6)

wherein $R^{15}$ represents hydrogen, a halogen, or a branched or unbranched $C_{1-30}$ alkyl group, a branched or unbranched $C_{2-30}$ alkenyl group, a branched or unbranched $C_{2-30}$ alkynyl group, or a group obtained by replacing a terminal hydrogen of the alkyl group with a hydroxy or carboxyl group; and $R^{16}$ represents a branched or unbranched $C_{1-30}$ alkylene group, a branched or unbranched $C_{2-30}$ alkenylene group, or a branched or unbranched $C_{2-30}$ alkynylene group, provided that $R^{15}$ and $R^{16}$ together may form a ring.

9. The tire rubber composition according to claim 1, which is for use as a rubber composition for a tread.

10. A pneumatic tire, comprising the tire rubber composition according to claim 1.

* * * * *